Aug. 18, 1959    M. B. SWISHER    2,899,793
SELF-PROPELLED RIDING LAWN MOWER
Filed July 23, 1956    5 Sheets-Sheet 1

*Fig. 1.*

INVENTOR.
Max B. Swisher.
BY
Fishburn & Gold
ATTORNEYS.

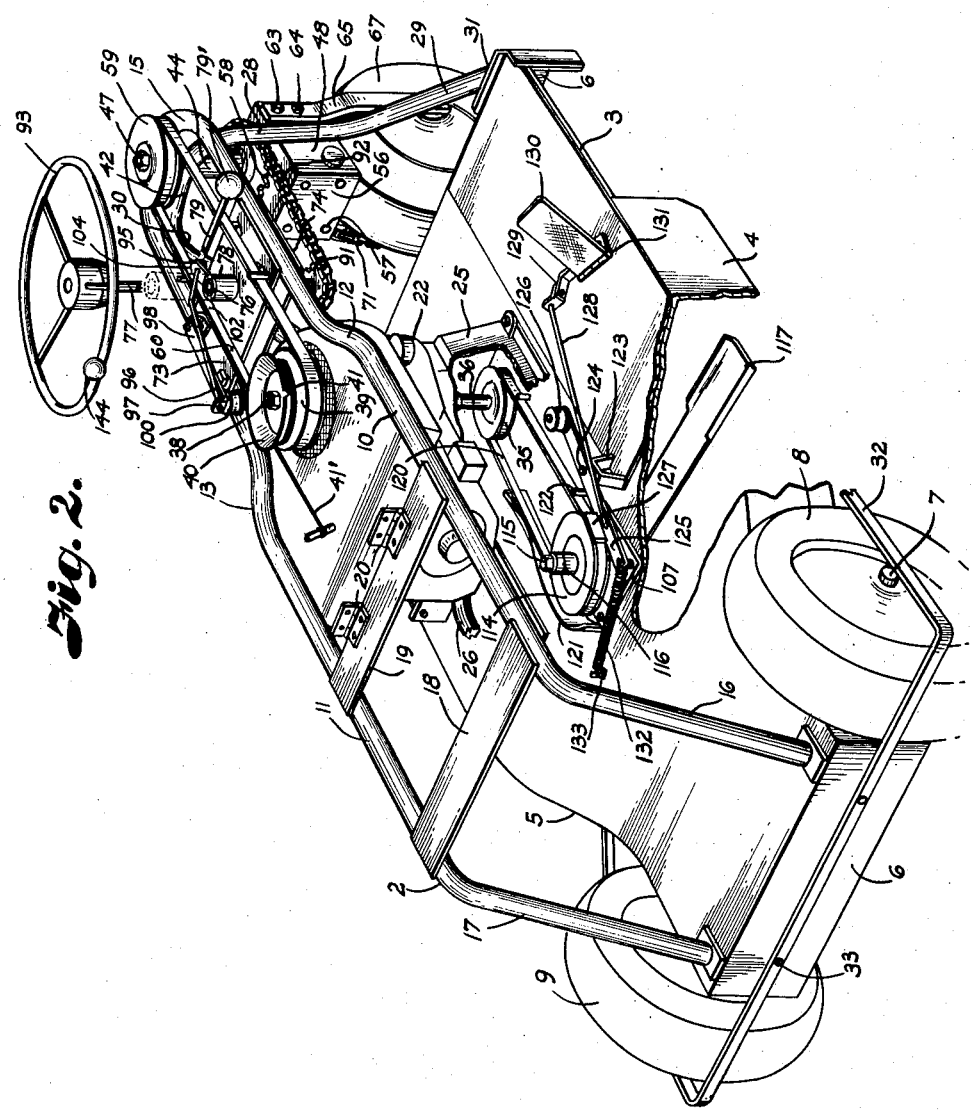

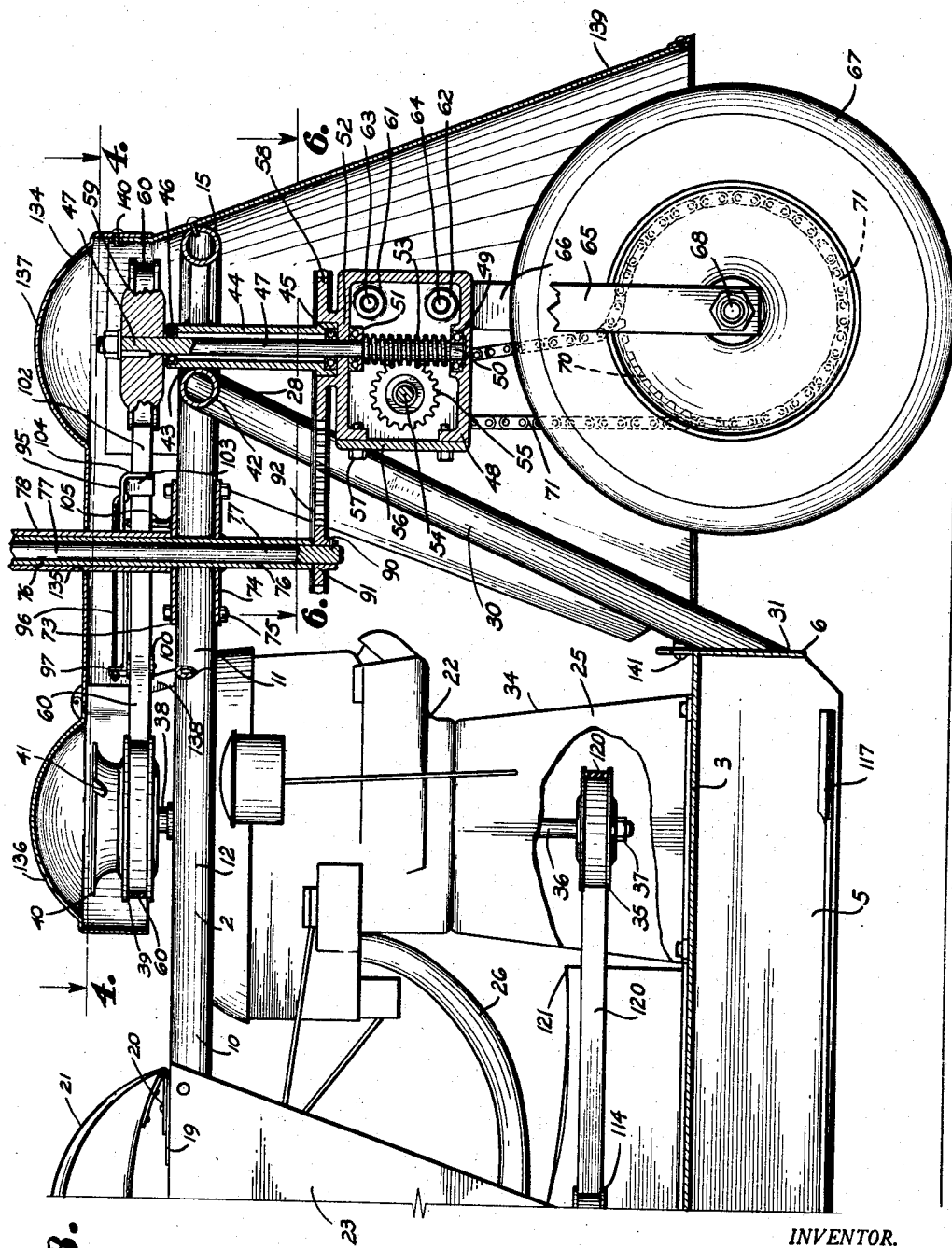

Aug. 18, 1959
M. B. SWISHER
2,899,793
SELF-PROPELLED RIDING LAWN MOWER
Filed July 23, 1956
5 Sheets-Sheet 4
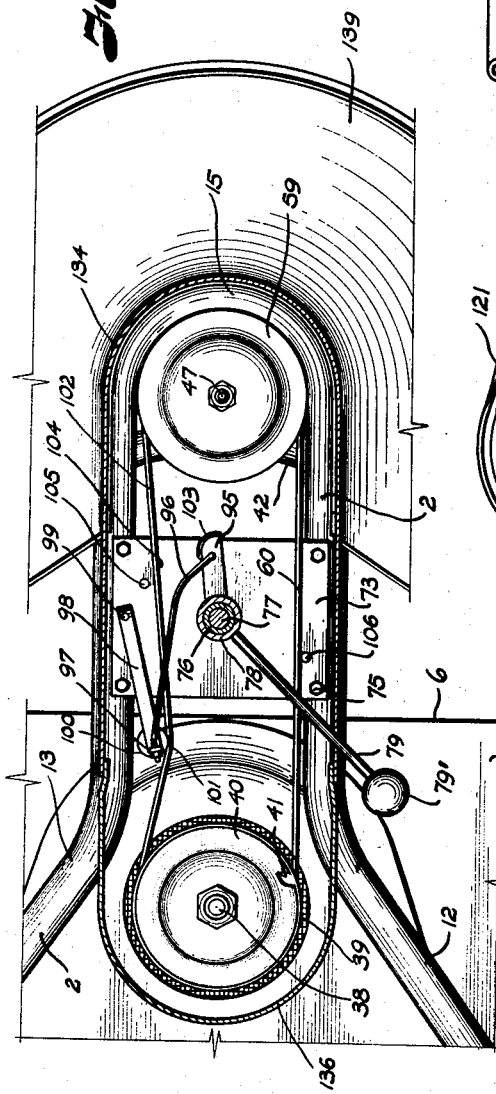
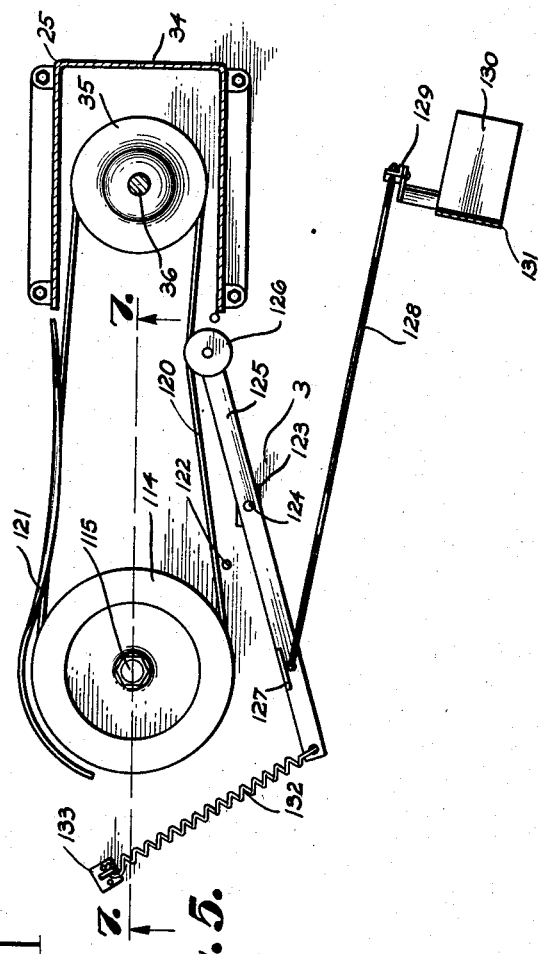
INVENTOR.
Max B. Swisher.
BY
Fishburn & Gold
ATTORNEYS.

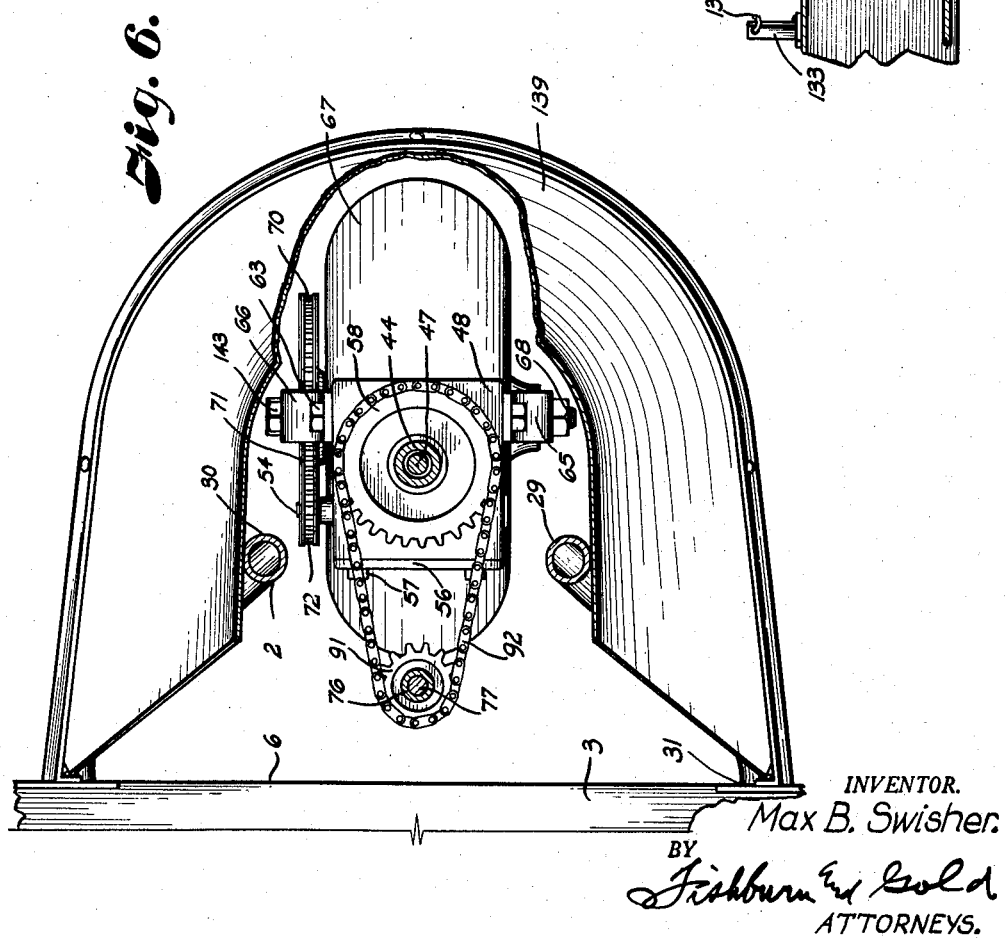

# United States Patent Office 2,899,793
Patented Aug. 18, 1959

2,899,793

SELF-PROPELLED RIDING LAWN MOWER

Max B. Swisher, Warrensburg, Mo., assignor to Swisher Mower and Machine Company, Inc., Warrensburg, Mo., a corporation of Missouri Application July 23, 1956, Serial No. 599,536

3 Claims. (Cl. 56—25.4)

The invention relates to a riding mower, and more particularly to a riding mower of self-propelled type having a rotary blade.

Various attempts have been made to devise a self-propelled riding type lawn mower and one which will be maneuverable over the terrain, but so far as applicant is aware no one has devised a riding self-propelled mower of the type wherein the mower is driven by a single wheel and that wheel used for guiding the mower.

It is the principal object of the present invention to provide a riding lawn mower of the rotary type wherein the mower is driven by a single front wheel and the guiding of the mower is done by the same wheel and wherein the mower may be operated in a rearward direction by rotating the shaft 180° upon which the wheel is mounted, although it may be rotated 360°.

Other objects of the present invention are to provide a riding lawn mower of three wheel type wherein the single wheel is mounted on the forward portion of the frame and used for driving the vehicle and also for steering the same; to provide a frame for the mower wherein the seat for the user is carried slightly to the rear of the rotary cutting blade; to provide a vertical shaft that is carried by the forward portion of the frame which extends into a gear box rotatably carried by said forward portion of the frame; to provide a chain and sprocket connection with the gear box and the front wheel of the mower for propelling the mower; to provide a steering apparatus having connection with the gear box and with said vertical shaft for steering the vehicle; to provide a motor substantially centrally of the frame of the vehicle and operatively connected to a shaft extending through the platform of the frame and upon which a cutting blade is mounted; to provide a shaft above the motor upon which a pulley is mounted in longitudinal alignment with a pulley on the vertical shaft extending into the gear box at the forward end of the frame; to provide a belt connecting the pulleys for operation by the motor of the vehicle which will rotate the cutting blade and also drive the vehicle through the belt connection with the vertical shaft and gear box; to provide a front wheel drive mechanism whereby the steering of the vehicle is accomplished and whereby the wheel may be turned through 360° for steering the vehicle, a 180° turn reversing the direction of the vehicle while the chain and sprocket connections are operated in the same direction by the motor; and to provide idler control levers and rollers for the belt for driving the vehicle.

Other objects of the present invention are to provide a self-propelled vehicle for cutting of grass wherein the frame-work is provided with a platform which houses the cutting blade; to provide for adjustment of the cutting height of the blade; to provide mechanism for operating the cutting blade by a foot pedal on the platform; to provide for operative engagement of the belt to rotate the blade and for idling of the cutting blade while the vehicle is moving; and to provide a device of this character simple and economical to manufacture.

In accomplishing these and other objects of the invention I have provided improved details of structure the preferred forms of which are illustrated in the accompanying drawings, wherein Fig. 1 is a side view of my riding, self-propelled lawn mower with parts of the frame housing broken away to better illustrate the driving mechanism of the front wheel, the latter shown in reversed position.

Fig. 2 is a perspective view of the frame of the vehicle and parts of the operating mechanism and particularly illustrating the driving mechanism for the cutting blade.

Fig. 3 is an enlarged cross sectional view of the front wheel driving mechanism with the wheel shown in forward direction.

Fig. 4 is a cross sectional plan view particularly illustrating the operating lever and link and roller arrangement for the driving belt of the front wheel drive mechanism, taken on line 4—4, Fig. 3.

Fig. 5 is a cross sectional plan view particularly illustrating the drive and idler mechanism for the belt driving the cutting blade.

Fig. 6 is a cross sectional plan view particularly illustrating the gears for the steering mechanism, taken on line 6—6, Fig. 3.

Fig. 7 is a fragmentary sectional view of the shaft and its driving connection for the cutting blade and the adjustment thereof, taken on line 7—7, Fig. 5.

Referring more in detail to the drawing:

1 designates a riding mower embodying the features of my invention comprising, a frame 2 upon which is mounted a platform 3 having depending sides 4 and 5 and a depending skirt 6 on the rear and front end. Mounted on the framework and extending through the sides 4 and 5 is a rear axle 7 for supporting wheels 8 and 9. The frame includes laterally spaced arms 10 and 11 running parallel and bent inwardly as indicated at 12 and 13 forming a reduced forward end 15. The rear end of the rods or tubular members 10 and 11 are turned downwardly forming posts 16 and 17 at the rear end of the structure and cross arms 18 and 19 are provided across the top of the framework. Hingedly mounted on the cross plate 19 by hinges 20 is a seat 21 which may be raised to provide access to the inner housing and to the rear side of the motor 22. A skirt or housing 23 is provided around the rear portion of the frame forming a back and sides thereto. The motor 22 is of gasoline type and has a gasoline tank 24 mounted on the frame. The motor is mounted on the platform 3 by a housing like bracket 25. The device is provided with the usual carburetor, spark plug, throttle and the like (not shown) as is the usual practice. The motor has an exhaust pipe 26 extending rearwardly therefrom and connecting with an outlet 27 on the rear of the housing 23.

The forward portion 15 of the top frame structure is supported by a yoke member 28 having legs 29 and 30 which are secured to the respective forward corners of the platform 3 as indicated at 31. A guard rail or strip 32 has its ends secured to the skirt 4 and 5 on either side of the machine and extends on the outside of the rear wheels 8 and 9 and is secured to the depending skirt 6 by bolts or the like 33.

The bracket 25 is substantially a U-shaped structure and has a closed forward side 34 for housing a pulley 35 mounted on a shaft 36 which extends from the lower side of the motor 22 and is held on the shaft by a nut 37. A shaft 38 extends vertically upwardly from the motor to above the frame and mounted thereon is a pulley 39. Mounted above the pulley 39 and secured to the shaft 38 is a starting pulley 40 having a notch 41 for a rope or the like 41' for starting the motor as is the usual practice.

Welded or otherwise suitably secured to a cross arm 42 of the yoke member 28 as indicated at 43 is a vertically extending sleeve bearing member 44 having a thrust bearing 45 at its lower end and ball bearings 46 at the upper end in which is adapted to be mounted a vertical drive shaft 47 which extends through the thrust bearing into a gear housing or box 48 having a bearing 49 in its lower end to receive the end 50 of the vertical shaft. A roller bearing 51 is also provided underneath the upper wall 52 of the gear box and a worm gear 53 is mounted on the lower end of the vertical shaft 47 between the bearings 49 and 51. A horizontal shaft 54 is mounted in the gear case 48 and upon which is mounted a sprocket or gear 55 meshing with the worm gear 53. The gear case includes a removable side 56 secured thereto by bolts or the like as indicated at 57.

The upper side of the gear case and formed integral therewith includes a sprocket 58 adapted to rotate with the gear case 48 as will later be described. A pulley 59 is mounted upon the upper end of the vertical shaft 47 and secured thereon by a nut. A belt 60 engages the pulleys 39 and 59 respectively for driving of the vehicle through the vertical shaft 47 and gear case 48 also as will later be described.

Secured to each side of the gear case 48 by stud bolts or the like 63 and 64 are depending brackets 65 and 66 forming an auxiliary frame for mounting the driving wheel 67 by an axle 68 extending through openings in the respective lower ends of the brackets 65 and 66. Threaded bosses 61 and 62 are provided in the gear housing for receiving the threaded ends of the stud bolts 63 and 64 to mount the brackets on the gear housing.

Rigidly mounted on the rim 69 of one side of the driving wheel 67 is a sprocket 70 for a chain 71 which runs over sprocket 72 mounted on the horizontal shaft 54 which extends outside of the gear case 48 as best illustrated in Fig. 1 for driving the front wheel through said gear and chain mechanism. When the gear case is in the position shown in Fig. 3 the vehicle will be operated in a forward direction and when the gear case is rotated and in the position shown in Fig. 1 the vehicle will operate in a reverse direction as will later be shown.

Mounted upon the upper and lower sides of the upper frame arms 10 and 11 are plates 73 and 74 secured at the four corners thereof by bolts or the like as indicated at 75. The plates have a central opening through which is rigidly mounted by welding or the like a tubular bearing member 76 for receiving a vertical steering shaft 77. A bearing housing 78 is sleeved over the steering sleeve 76 and the lower end thereof rests upon the plate 73. An idler control lever 79 having a knob 79' is secured to the bearing housing 78 for idling the motor or for engaging the driving mechanism as later described.

Mounted upon the lower end of the steering shaft 77 by a set screw or the like 90 is a sprocket 91 for accommodating an endless chain 92 which runs over sprocket 58 on the gear case 48 whereby rotation of the steering wheel 93 mounted on the upper end of the steering shaft 77 will rotate said shaft to rotate the gear case on which is mounted the driven front wheel 67 through the sprocket 58 to guide the vehicle and also for rotating the gear case 180° to reverse the movement of the vehicle.

Mounted upon the bearing housing 78 is an arm 95 extending outwardly therefrom to which is pivotally connected a rod 96 having its other end secured to a laterally turned free end 97 of a control link 98 having its other end pivotally mounted to the plate 73 by a pin or the like 99. Rotatably mounted underneath the free end of the link 98 is a roller or idler pulley 100 adapted to engage and force the belt 60 inwardly whereby the roller will tighten the belt on the pulleys 39 and 59 as indicated at 101, Fig. 4, to attain driving connection therebetween. This tightening of the belt is accomplished by moving the control lever 79 towards the pulley 39 whereby the rotation of the bearing housing or sleeve 78 will cause the arm 95 on the bearing housing to move in the same direction as the control lever, which in turn will force the control link 98 which has connection with the arm 95 by the rod 96 towards the belt thus engaging the roller 100 therewith. By moving the control lever 79 into a position as shown in Figs. 1 and 2, the operation above described will be reversed whereby the roller 100 is disengaged from the run 102 of the belt 60 and thereby loosening the belt from the pulleys 39 and 59 and disengaging the driving connection therebetween. This operation of disengaging the idler mechanism also causes the arm 95 to move toward the run 102 of the belt until the outer end 103 of said arm engages against the inner side of the run 102 at a point 104 and thereby pressing the belt against an upright finger 105 on the outer side of the run 102 thus bringing the belt 60 to a complete stop and allowing a smooth idling of the pulley 39 while the motor is in operation. This inoperative position of the idler assembly will also be necessary for starting the motor 22 with start pulley 40 which is rigidly secured to pulley 39 as previously described. Guide members 106 might be arranged on the plate 73 along the runs of the belt 60 to prevent a complete disengaging of the belt from the pulleys 39 and 59.

Mounted upon the platform 3 and spaced rearwardly from the motor mounting is a plate 107 secured to the platform by bolts or the like 108. The plate has an opening 109 in the center thereof and welded or otherwise rigidly secured therein is an elongated bearing housing 110 for a blade bolt or shaft 111 extending therethrough, bearings being provided therein with rollers as indicated at 112 and 113. Mounted upon the upper end of the bolt or shaft 111 is a pulley 114 and secured thereon by head 115 of the bolt 111. If desired washers, sleeves or the like 116 may be placed upon the upper side of the pulley 114 (Fig. 2) or below the bearing sleeve 110 (Fig. 7) to adjust the length of the depending portion of the bolt 111 and thereby the height of the cutting blade 117 which is secured on the threaded lower end 118 of the bolt 111 by nut 119.

A belt 120 is provided for engaging the pulleys 114 and 35 respectively. A guide member 121 is mounted on the platform near the pulley 114 for the belt 120. Spaced pins as indicated at 122 are also provided on the opposite side of the belt for holding the belt in line. A U-shaped bracket member 123 is mounted on the platform 3 and pivotally mounted thereon by pin or bolt 124 is an arm 125 on one end of which is mounted a roller or idler pulley 126 for engaging the belt 120. The arm 125 has an upwardly extending flange 127. Pivotally mounted on the other end of the arm 125 is one end of a rod 128 the other end of which extends forwardly and is secured to a bracket 129 of a foot pedal 130 hingedly mounted to the platform 3 near the forward edge thereof as indicated at 131. The upstanding plate 127 is adapted to engage the pulley 114 to act as a brake for stopping rotation of the blade if desired. A coil spring 132 is provided having one end secured to the rear end of the arm 125 and the other end of the spring is anchored to the platform as indicated at 133 for holding the roller 126 out of contact with the belt, when pressure on the foot pedal is released.

A guard or housing 134 is provided for covering the pulleys 40 and 59 to guard the belt 60 and the steering apparatus extends through an opening 135 in the guard as illustrated in Fig. 3. The rear portion of the housing has a hinged dome shaped door 136 for providing access to the starting wheel 40 and the forward end of the housing is also dome shaped as indicated at 137. The housing is secured to the frame by brackets 138 secured to the framework as illustrated in Fig. 1 and a skirt or housing member 139 extends around the front portion of the drive wheel and gear assembly as also illustrated in Fig. 1 and is secured to the guard or housing member 134 by set screws, bolts or the like 140 and also to the framework structure 2 and platform 3 by screws 141.

Operation of the mower constructed and assembled as described is as follows:

It will be noted that in Fig. 1 the front wheel drive is positioned for rearward movement of the vehicle and in Fig. 2 the vehicle is in position for forward direction and it will be noted from my description of operation that the chain 71 moves or operates in the same direction at all times but inasmuch as the entire assembly is rotated the wheel will move in the opposite direction.

After the motor 22 has been started or energized by the starter rope the belt 60 on pulleys 39 and 59 will be operating in idle position. At that time the lever 79 on the steering sleeve 78 will be in neutral position or as shown in Figs. 1 and 2. By movement of the lever rearwardly towards the operator or in the position shown in Fig. 4 the arm 95 will pull the rod 96 and thus move the arm 98 inwardly so that the roller 100 will engage the belt 60 to tighten the same and thus rotate the pulley 59 on the shaft 47 to operate the gears in the gear case 48 through the worm gear 53 and the sprocket 55 which operates the chain 71 running over the sprocket 70 to drive the front wheel 67 thus moving the vehicle in a forward direction. It will be noted in Fig. 1 the chain 71 moves over a lug 142 secured to the bracket arm 65 for the wheel 67 by bolt 143 to prevent the chain from dragging on the bracket 65.

Steering of the vehicle is accomplished by rotation of the steering wheel 93 through its shaft 77 and sprocket 91 on the lower end thereof through the chain 92 running over the sprocket 58 on the gear case 48. The front driving wheel being secured to the gear case so that it will turn therewith, turning of the gear case turns the wheels for guiding the vehicle.

When it is desired to reverse the vehicle the gear case is turned 180° so that the gear case and driving wheel and sprocket will be in the position shown in Fig. 1 but the motor will still operate the belt and gear mechanism in the same direction so that all parts will move in the same direction when the vehicle is moving forward as they do when in reverse except that the wheel will move the vehicle in a reverse direction. A knob 144 is secured to the steering wheel for convenience in guiding and making a complete revolution of the wheel when desired.

The blade idler control assembly is particularly illustrated in Figs. 5 and 7. The blade is put in operation by pressing downwardly on the foot pedal 130 on the floor board 3 to move the rod 128 forwardly thus moving the rear end of the arm 125 outwardly and the end of the arm with the roller 126 thereon inwardly so that the roller contacts the belt 120 running over pulleys 35 and 114 so that the blade 117 will be rotated through the shaft 111 on which the pulley 114 is secured. When it is desired to stop rotation of the blade 117 the foot is released from the foot pedal 130 and the blade mechanism then becomes inoperative while the belt 120 merely idles over the pulleys 35 and 114 whereby the spring 132 forces the stop plate 127 on the arm 125 in contact with the pulley 114, thereby acting as a brake and stopping the rotation of pulley 114 and blade 117 while pulley 35 might be idling.

It will be obvious from the foregoing that the blade may rotate while the vehicle is in immobile position or standing still or the vehicle may be moved through the driving mechanism when the blade is not rotating or in cutting operation.

It will be obvious from the foregoing that I have provided an improved driving mechanism for a riding mower wherein the driving is accomplished by a single front wheel which may be rotated 360° for steering and 180° for reversing the movement of the vehicle.

It will further be obvious that I have provided an improved driving connection for driving and idling mechanism for the belts and pulleys driving the vehicle and also for the rotation of the cutting blade independently one of the other or simultaneously.

It will further be obvious that I have provided an improved vehicle safe in operation and maneuverable so as to guide the vehicle around shrubs and trees and the like.

What I claim and desire to secure by Letters Patent is:

1. A self-propelled riding type lawn mower comprising, a chassis having rear supporting wheels and a front driven steering wheel, a motor on the chassis having a vertically arranged shaft, a horizontally rotatable cutter on said chassis having a vertically extending shaft, drive connections between said motor shaft and said cutter and front driven steering wheel, and steering means on said chassis connected to said front driven steering wheel.

2. A self-propelled riding type lawn mower as set forth in claim 1 wherein a rider seat is mounted on the chassis adjacent to and rearwardly of said motor, said cutter shaft being substantially under said rider seat.

3. A self-propelled riding type lawn mower as set forth in claim 2 wherein the drive connection between the motor shaft and the cutter consists of aligned pulleys on the respective motor shaft and cutter shaft, a belt loosely connecting said pulleys, and means on the chassis for engaging said belt to tighten same on the pulleys to cause the cutter to rotate.

References Cited in the file of this patent

UNITED STATES PATENTS

| | | |
|---|---|---|
| 1,103,678 | Marsh | July 14, 1914 |
| 1,221,334 | King | Apr. 3, 1917 |
| 1,230,340 | Sweet | June 19, 1917 |
| 1,266,904 | Baker | May 21, 1918 |
| 1,560,042 | Davison | Nov. 3, 1925 |
| 2,582,177 | Swisher et al. | Jan. 8, 1952 |
| 2,620,612 | De Eugenio | Dec. 9, 1952 |
| 2,659,445 | Church | Nov. 17, 1953 |
| 2,674,837 | Buck | Apr. 13, 1954 |
| 2,705,393 | Cofer | Apr. 5, 1955 |
| 2,765,861 | Ekas | Oct. 9, 1956 |

FOREIGN PATENTS

| | | |
|---|---|---|
| 744,916 | Great Britain | Feb. 15, 1956 |